United States Patent Office 3,484,436
Patented Dec. 16, 1969

3,484,436
BICYCLO[2.2.2]OCTANE - 1 - -CARBOXYLATE ESTERS OF Δ⁴ - PREGNENE CORTICOID STEROIDS
Alexander D. Cross, Mexico City, Mexico, and John H. Fried, Palo Alto, Calif., assignors to Syntex Corporation, Panama, Panama, a corporation of Panama
No Drawing. Filed Sept. 7, 1967, Ser. No. 665,996
Int. Cl. C07c 169/36, 173/00, 167/28
U.S. Cl. 260—239.55                32 Claims

ABSTRACT OF THE DISCLOSURE

Bicyclo[2.2.2]octane - 1 - carboxylate, bicyclo[2.2.2]octane - 1 - methylenecarbonate, and tricyclo[3.3.1.1$^{1,5}$]decane-1-methylenecarbonate esters of Δ⁴ pregnane corticoid steroids which esters are useful for their long-acting corticoid and anti-inflammatory activity and processes for the preparation of these novel esters.

---

This invention relates to new and useful steroid esters. It more specifically pertains to novel and useful steroidal bicyclo[2.2.2]octane - 1 - carboxylate, bicyclo[2.2.2]octane - 1 - methylenecarbonate, and tricyclo[3.3.1.1$^{1,5}$]decane-1-methylenecarbonate esters as well as various molecularly modified derivatives thereof, the steroid nucleus thus bearing a novel group represented by the Formulas A, B, and C:

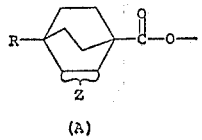 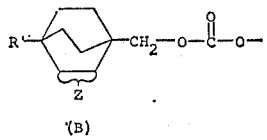
(A) (B)

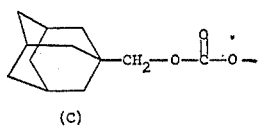
(C)

wherein, in each applicable formula, R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R, exclusive of cyano, acyloxy, and acyloxymethyl; and Z is a carbon-carbon single bond or a carbon-carbon double bond.

In the preferred embodiments hereof, the steroid nucleus is substituted at the C-3 and/or C-21 positions with a group represented by one of the above Formulas A, B, and C or at position C-17 with a group represented by the above Formula A.

The novel steroid esters of the present invention are of the corticoid series and are represented by the following Formula I:

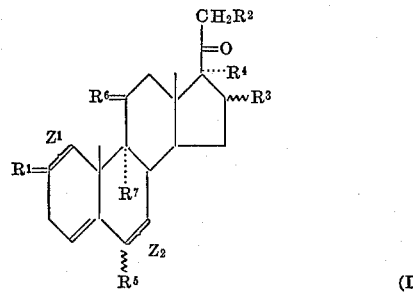

wherein R¹ is an oxygen atom or the group

in which R⁸ is hydroxy and the conventional hydrolyzable esters thereof, tetrahydropyran-2-yloxy, tetrahydrofuran-2-yloxy, cyclopentyloxy, or a polycyclic group represented by one of the above Formulas A, B, and C; R² is hydroxy and the conventional hydrolyzable esters thereof, or a polycyclic group represented by one of the above Formulas A, B, and C; R³ is hydrogen, hydroxy and the conventional hydrolyzable esters thereof, or a polycyclic group represented by the above Formula A; R⁴ is hydrogen, hydroxy, methyl, or when taken together with R³, alkylidenedioxy; R⁵ is hydrogen, chloro, fluoro, or methyl; R⁶ is an oxygen atom or the group

in which R⁹ is hydroxy or chloro; R⁷ is hydrogen, chloro, fluoro, or when taken together with R⁶, β-oxido, R⁷ and R⁹ being the same when R⁹ is chloro; each of Z¹ and Z² is a carbon-carbon single bond, a carbon-carbon double bond; or a methylene group of the formula $$\diagdown_{C}\diagup^{X}_{Y}$$

in which each of X and Y is hydrogen, chloro, or fluoro; Z¹ being a carbon-carbon single bond when R¹ is other than an oxygen atom; one of R², R³, and R⁸ being said polycyclic group.

The terms "(lower)alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" is included aryl, aralkyl, and alkaryl groups, such as phenyl, p-chlorophenyl, p-methoxyphenyl, benzyl, phenethyl, tolyl, ethylphenyl, and the like. The wavy line (ξ) designates and includes both the alpha and beta configurations.

Thus included within the scope of the present invention are the novel steroid esters represented by the following Formulas I-a, I-b, I-c, I-d, I-e, I-f, and I-g:

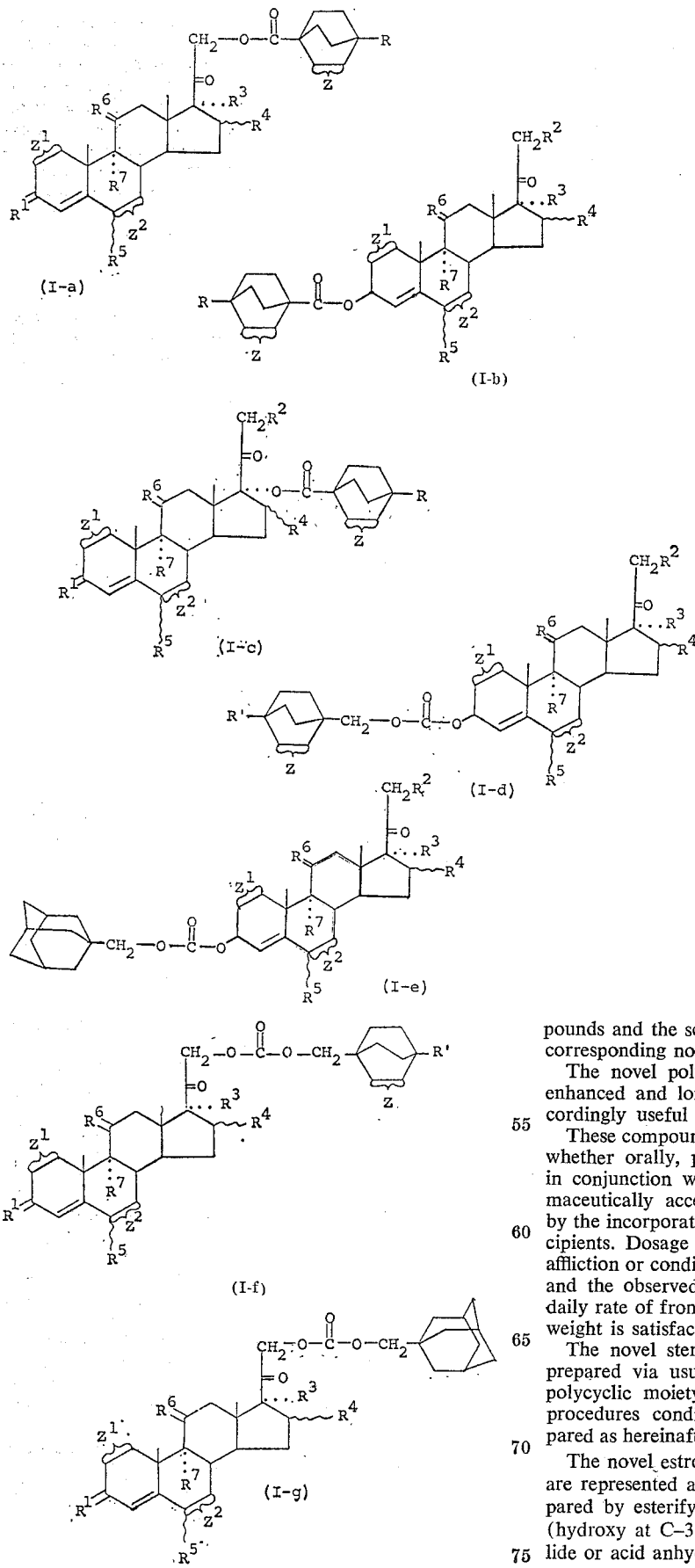

wherein, in each formula, each of R, R', $R^1$, $R^2$, $R^3$, $R^4$, $R^5$, $R^6$, $R^7$, Z, $Z^1$, and $Z^2$ is as hereinbefore defined.

It will be understood that the above represented compounds and the scope of the instant invention include the corresponding novel steroidal bis esters and tri esters.

The novel polycyclic esters of this invention possess enhanced and long-acting corticoid activity and are accordingly useful as anti-inflammatory agents.

These compounds are administered via the usual routes, whether orally, parenterally, or topically, either singly, in conjunction with other medicinal agents, or in pharmaceutically acceptable non-toxic compositions formed by the incorporation of any of the normally employed excipients. Dosage levels vary according to the particular affliction or condition being treated, its degree or severity, and the observed response to treatment but generally a daily rate of from .01 mg. to 1 mg. per kilogram of body weight is satisfactory.

The novel steroid esters of the present invention are prepared via usual esterification reaction union of the polycyclic moiety with the steroid moiety, the specific procedures conditioned upon the particular ester prepared as hereinafter set forth in more detail.

The novel estrogen steroid bicyclic esters hereof which are represented above by Formulas I-a and I-b are prepared by esterifying the corresponding steroidal alcohol (hydroxy at C-3 and/or C-21) either with the acid halide or acid anhydride which otherwise correspond to the groups represented by Formula A, that is, a bicyclo[2.2.2]octanoic acid halide (preferably, chloride), a bicyclo[2.2.2]octanoic anhydride (preferably, (lower)alkanoic anhydride), or the corresponding C–2 unsaturated and/or C–4 substituted derivatives thereof. Alternatively, the acid per se or the esters thereof can be so employed.

In the practice of the preferred aspects of the above preparation, the reaction is conducted in the presence of base, such as is provided by an organic tertiary amine, for example, triethylamine, pyridine, and the like. The reaction is also conducted with an inert solvent, such as dioxane, tetrahydrofuran, diethyl ether, benzene, xylene, and the like, with the reaction being carried out at temperatures of from about 0° C. to about 100° C. or higher upwards of 150° C. Temperatures below 0° C. may be employed depending mainly upon reactants and reaction choice.

The novel mono ester is simply introduced at C–21 by esterifying the 3-keto-$\Delta^4$-17$\alpha$,21-diol or -21-mono-ol by the above procedure. Thereafter, either of the 3-hydroxy (obtained via selective reduction of the 3-keto) and/or 17-hydroxy groups can be esterified to a conventional hydrolyzable ester giving the corresponding mixed ester derivatives.

The novel mono ester at C–3 is prepared by, first, etherifying the C–21 hydroxy group, if present, such as to the protective tetrahydropyranyl grouping followed by selective reduction of the 3-keto group such as with sodium borohydride in anhydrous isopropanol and esterification, as described above, of the resultant 3-hydroxyl. Hydrolysis with a dilute acid solution removes the 21-tetrahydropyranyloxy grouping. Thereafter, the various mixed ester derivatives are formed, if desired, upon conventional esterification at any remaining hydroxyl groups.

The bicyclo[2.2.2]octane- and bicyclo[2.2.2]oct-2-ene-1-carboxylic acid halides and anhydrides for the above procedures are prepared from the corresponding free acid compounds by methods known per se as described, for example, in Wagner and Zook, Synthetic Organic Chemistry, John Wiley and Sons, Inc., New York (1953), p. 546 et seq. and p. 558 et seq., respectively.

The corresponding free carboxylic acid compounds from which the acid halides and acid anhydrides are formed are also prepared by known methods. One such method involves treating a 4-substituted or -unsubstituted cyclohexa-1,3-diene-1-carboxylic acid or -1-carboxylate by the Diels-Alder addition of ethylene, such as according to the conditions set forth in U.S. Patent 3,081,334 to afford the corresponding 4-substituted or -unsubstituted bicyclo[2.2.2]octane-1-carboxylic acids. Thereafter, the thus obtained saturated acids can be dehydrogenated to the corresponding 4-substituted or -unsubstituted bicyclo[2.2.2]oct-2-ene-1-carboxylic acids. Other suitable methods for preparing these acids are set forth by Holtz et al., J. M. Chem. Soc., 86, 5183 (1964); Kauer et al., J. Org. Chem., 30, 1431 (1965); Grob et al., Helv. Chim. Acta., 41, 1191 (1958); Roberts et al., J. Am. Chem. Soc., 75, 637 (1953); Belgium Patent 665,710; and Netherlands Patent 6507979.

The novel mono esters at C–17 represented above by Formula I–c are prepared by treatment of the appropriate 3,20-diketo-17$\alpha$,21-dihydroxy compound with a bicyclo[2.2.2]octane-1-trialkoxymethyl reagent, preferably a bicyclo[2.2.2]octane-1-trimethoxymethyl compound, or a 2-unsaturated or 4-substituted derivative thereof. This reaction is conducted in inert organic solvent in the presence of acid catalyst. The resultant 17$\alpha$,21-methylidenedioxy ortho ester is subjected to acid hydrolysis in organic reaction medium to afford the 17$\alpha$-monoester of the 3,20-diketo-17$\alpha$,21-dihydroxy steroids. Conventional esterification of remaining hydroxy groups then furnishes the mixed ester compounds.

The preparation of the trialkoxy reagent of the bicyclo compounds is preferably accomplished by first converting the free acid to the acid chloride, thence to the amide, thence to the nitrile, all of which conversions are well known. The nitrile is then treated with an alkanolic (preferably, methanolic) hydrochloride solution preferably at room temperature to give the corresponding imine hydrochloride salt which is treated at about room temperature in an excess of alkanol (preferably, methanol) solvent thus furnishing the corresponding bicyclo trialkoxymethyl reagent.

The novel corticoid steroid bicyclo carbonate esters hereof which are represented above by Formulas I–d and I–f are prepared analogously to the methods operable for the preparation of the compounds of Formulas I–b and I–a as set forth above utilizing, instead, the appropriate steroidal alcohol with the chlorocarbonate (chloroformate) which otherwise correspond to the groups represented by Formula B, that is, a bicyclo[2.2.2]octane-1-methylenechlorocarbonate or the corresponding C–2 unsaturated and/or C–4 substituted derivatives thereof.

The chlorocarbonate reactants are conveniently prepared via known procedures. First, the corresponding free carboxylic acid compound (obtained as set forth above) is conventionally reduced such as with an alkali metal hydride, for example, lithium aluminum hydride, and the like, in an inert solvent, as described by Wagner and Zook, op. cit., p. 155 et seq., and the resultant alcohol (methylol) treated with phosgene such as according to the procedure described in Wagner and Zook, op. cit., p. 483 et seq.

The novel corticoid steroid tricyclic carbonate esters hereof which are represented above by Formulas I–e and I–g are prepared analogously to the methods set forth above for the preparation of the bicyclic carbonate esters with the substitution of the corresponding tricyclic chlorocarbonate (chloroformate), which otherwise corresponds to the group represented by Formula C above, namely, tricyclo[3.3.1.1$^{1,5}$]decane-1-methylenechlorocarbonate, in lieu of the bicyclo derivatives.

This tricyclic chlorocarbonate compound is similarly prepared from tricyclo[3.3.1.1$^{1,5}$]decane - 1 - carboxylic acid, otherwise referred to as adamantane-1-carboxylic acid, upon conventional reduction as described above giving the corresponding alcohol (methylol) derivative followed by treatment thereof with phosgene as likewise mentioned supra.

The novel bisesters are conveniently prepared according to the foregoing procedures in preferred sequences. Thus, the C–3,21 bisesters are prepared by esterifying at C–21 followed by selective reduction and esterification at C–3. The C–17,21 bisesters follow by first forming the C–17 monoester and thereafter esterifying the C–21 hydroxyl. C–3,17 bisesters are formed by preparing the 17-monoester, protecting the C–21 hydroxyl via the tetrahydropyranyl ether, reducing and esterifying at C–3, and, finally, removing the ether protecting group by mild hydrolysis. The triester follows upon esterification at C–21 of the latter compounds.

The steroidal alcohol starting compounds are known in the art or can be prepared via processes known per se.

Substituents represented by $R^5$ are preferably present in the starting steroids although the 6-halo groups can be introduced by converting the 3-keto-4-ene to its enol ether, such as by treatment with ethyl orthoformate and treating the thus prepared enol ether intermediate with N-chloro succinimide or perchloryl fluoride, respectively, yielding the 3-keto-4,6-diene containing a 6-chloro or 6-fluoro group.

The substituents represented by $R^2$, $R^3$, and $R^4$ are likewise present in the starting steroid. 16$\alpha$,17$\alpha$-acetals and -ketals are prepared upon treatment of a 16$\alpha$,17$\alpha$-dihydroxy compound with an aldehyde or ketone in the presence of an acid, such as perchloric acid.

The substituents represented by $R^6$ and $R^7$ may be present in the starting steroid or may be subsequently introduced via conventional procedures. Thus, an 11$\beta$-hydroxy compound is dehydrogenated to yield a 9(11)- ene. This compound is converted to the 9β,11β-oxido derivative, then to the bromohydrin intermediate. Treatment of the oxido compound with hydrogen fluoride or hydrogen chloride then yields the 9α-fluoro-11β-hydroxy or 9α-chloro-11β-hydroxy compounds. Alternatively, the 9(11)-ene is treated with chlorine to yield the 9α,11β-chloro derivative.

The conjugated unsaturated ssytem is introduced as follows. By treating a 3-keto-Δ⁴ with 2,3-dichloro-5,6-dicyano-1,4-benzoquinone (D.D.Q.) in, for example, dioxane solvent the corresponding 3-keto-Δ$^{1,4}$-diene is prepared. Treatment of the 3-keto-Δ⁴-ene with chloranil in ethyl acetate and in the presence of acetic acid, the corresponding 3-keto-Δ$^{4,6}$-diene is prepared. Similar treatment of the 3-keto-Δ$^{4,6}$-diene with chloranil in n-amyl alcohol affords the corresponding 3-keto-Δ$^{1,4,6}$-triene compound.

Introduction of the halomethylene group at either of positions C-1,2 and/or C-6,7 involves treatment of the conjugated unsaturated steroid with a molar excess of an alkali or alkaline earth metal salt of a haloacetic acid, such as bromochloroacetic acid, dichloroacetic acid, trichloroacetic acid, chlorofluoroacetic acid, dichlorofluoroacetic acid, chlorodifluoroacetic acid, and the like. Use of the trihalo acid introduces the dihalomethylene group while a dihalo acid provides the monohalomethylene group.

It is preferable to conduct this latter reaction after certain labile substituents, such as hydroxy groups, have been protected, for example, by converting them to esters, tetrahydropyranyl ethers, or ketones which groups readily facilitate the regeneration of the hydroxyl. This preference is not an absolute necessity, however, since the hydroxyl group which readily becomes involved in side reactions can be regenerated upon execution of a mild hydrolysis.

The C-1,2 and/or C-6,7 fused methylene group is introduced by reaction of the conjugated unsaturated steroid with dimethylsulfoxonium methylide base in dimethylsulfoxide. Alternatively, this group can be provided upon reductive dehalogenation, such as with lithium aluminum hydride, of a halomethylene group, inserted as described above.

These groups can be inserted in 3-keto-Δ$^{1,4}$-diene to give the C-1,2 adduct and a 3-keto-Δ$^{4,6}$-diene to give the C-6,7 adduct. The bis substituted derivatives are ideally prepared by first introducing the desired group at C-1,2 and thereafter generating the Δ$^{4,6}$ system and introducing the desired group at C-6,7.

The halomethylene and methylene groups so inserted are accomplished with the orientation of the resultant fused grouping including both isomeric alpha and beta configurations in variable ratios. Each isomer can be separated and removed via conventional techniques, such as chromatography, fractional recrystallization, and the like, by virtue of their different physical properties. Although, in some instances, one particular configurational isomer may predominate in the reaction mixture; it will be understood that each, whether specifically mentioned or not, is included within the scope of the present invention.

The C-3 elaboration follows after all other desired substitution has taken place. Thus, treatment of the C-3 hydroxy compound with dihydropyran or dihydrofuran gives the corresponding tetrahydropyran-2-yl and tetrahydrofuran-2-yl ethers thereof, respectively. Similar treatment thereof with sodium hydride and cyclopentyl bromide affords the C-3 cyclopentyl ether. Similarly, these ether groups can be introduced at the C-17 and/or C-21 positions, if it is so desired.

The following examples illustrate the manner by which this invention can be practiced and are not to be construed as limitations upon the overall scope hereof but rather as illustrations hereof.

EXAMPLE 1

A mixture of 2.5 g. of pregn-4-ene-11β,17α,21-triol-3,20-dione in 15 ml. of pyridine containing 4.0 g. of bicyclo[2.2.2]octane-1-carboxylic acid chloride is heated at steam bath temperature for about two hours. The mixture is then poured into ice water and the solid which forms collected by filtration, washed with water, and dried yielding 21-(bicyclo[2.2.2]octane-1'-carbonyloxy) pregn-4-ene-11β,17α-diol-3,20-dione.

In like manner, the following 21 novel esters are prepared as set forth above, utilizing the requisite 21-hydroxy starting compounds:

6α-fluoro-16α-methyl-21-(bicyclo[2.2.2]octane-1'-carbonyloxy)pregna-1,4-dien-11β-ol-3,20-dione,
6α-fluoro-16α-methyl-21-(4'-methylbicyclo[2.2.2] octane-1'-carbonyloxy)pregna-1,4-dien-11β-ol-3,20-dione,
6α-fluoro-16α-methyl-21-(bicyclo[2.2.2]oct-2'-ene-carbonyloxy)pregna-1,4-dien-11β-ol-3,20-dione,
6α-fluoro-16α-methyl-21-(4'-methylbicyclo[2.2.2]oct-2'-ene-1'-carbonyloxy)pregna-1,4-dien-11β-ol-3,20-dione,
6α-fluoro-16α-methyl-21-(bicyclo[2.2.2]octane-1'-carbonyloxy)pregna-1,4-diene-11β,17α-diol-3,20-dione,
6α-fluoro-16α-methyl-21-(4'-methylbicyclo[2.2.2] octane-1'-carbonyloxy)pregna-1,4-diene-11β,17α-diol-3,20-dione,
6α-fluoro-16α-methyl-21-(bicyclo[2.2.2]oct-2'-ene-1'-carbonyloxy)pregna-1,4-diene-11β,17α-diol-3,20-dione,
6α-fluoro-16α-methyl-21-(4'-methylbicyclo[2.2.2] oct-2'-ene-1'-carbonyloxy)pregna-1,4-diene-11β,17α-diol-3,20-dione,
6α-fluoro-16α,17α-isopropylidenedioxy-21-(bicyclo-[2.2.2]octane-1'-carbonyloxy)pregna-1,4-dien-11β-ol-3,20-dione,
6α-fluoro-16α,17α-isopropylidenedioxy-21-(4'-methylbicyclo[2.2.2]octane-1'-carbonyloxy)pregna-1,4-dien-11β-ol-3,20-dione,
6α-fluoro-16α,17α-isopropylidenedioxy-21-(bicyclo [2.2.2]oct-2'-ene-1'-carbonyloxy)pregna-1,4-dien-11β-ol-3,20-dione,
6α-fluoro-16α,17α-isopropylidenedioxy-21-(4'-methylbicyclo[2.2.2]oct-2'-ene-1'-carbonyloxy)pregna-1,4-dien-11β-ol-3,20-dione,
6α,9α-difluoro-16α-methyl-21-(bicyclo[2.2.2]octane-1'-carbonyloxy)pregna-1,4-dien-11β-ol-3,20-dione,
6α,9α-difluoro-16α-methyl-21-(4'-methylbicyclo[2.2.2] octane-1'-carbonyloxy)pregna-1,4-dien-11β-ol-3,20-dione,
6α,9α-difluoro-16α-methyl-21-(bicyclo[2.2.2]oct-2'-ene-1'-carbonyloxy)pregna-1,4-dien-11β-ol-3,20-dione,
6α,9α-difluoro-16α-methyl-21-(4'-methylbicyclo[2.2.2] oct-2'-ene-1'-carbonyloxy)pregna-1,4-dien-11β-ol-3,20-dione,
6α,9α-difluoro-16α-methyl-21-(bicyclo[2.2.2]octane-1'-carbonyloxy)pregna-1,4-diene-11β,17α-diol-3,20-dione,
6α,9α-difluoro-16α-methyl-21-(4'-methylbicyclo[2.2.2] octane-1'-carbonyloxy)pregna-1,4-diene-11β,17α-diol-3,20-dione,
6α,9α-difluoro-16α-methyl-21-(bicyclo[2.2.2]oct-2'-ene-1'-carbonyloxy)pregna-1,4-diene-11β,17α-diol-3,20-dione,
6α,9α-difluoro-16α-methyl-21-(4'-methylbicyclo[2.2.2] oct-2'-ene-1'-carbonyloxy)pregna-1,4-diene-11β,17α-diol-3,20-dione,
6α,9α-difluoro-16α,17α-isopropylidenedioxy-21-(bicyclo-[2.2.2]octane-1'-carbonyloxy)pregna-1,4-dien-11β-ol-3,20-dione,
6α,9α-difluoro-16α,17α-isopropylidenedioxy-21-4'-methylbicyclo[2.2.2]octane-1'-carbonyloxy)pregna-1,4-dien-11β-ol-3,20-dione, 6α,9α-difluoro-16α,17α-isopropylidenedioxy-21-(bicyclo[2.2.2]octane-1'-carbonyloxy)pregna-1,4-dien-11β-ol-3,20-dione,
6α,9α-difluoro-16α,17α-isopropylidenedioxy-21-(4'-methylbicyclo[2.2.2]oct-2'-ene-1'-carbonyloxy)pregna-1,4-dien-11β-ol-3,20-dione,
6α-fluoro-9α,11β-dichloro-16α-methyl-21-(bicyclo[2.2.2]octane-1'-carbonyloxy)pregna-1,4-diene-3,20-dione,
6α-fluoro-9α,11β-dichloro-16α-methyl-21-(4'-methylbicyclo[2.2.2]octane-1'-carbonyloxy)pregna-1,4-diene-3,20-dione,
6α-fluoro-9α,11β-dichloro-16α-methyl-21-(bicyclo[2.2.2]oct-2'-ene-1'-carbonyloxy)pregna-1,4-diene-3,20-dione,
6α-fluoro-9α,11β-dichloro-16α-methyl-21-(4'-methylbicyclo[2.2.2]oct-2'-ene-1'-carbonyloxy)pregna-1,4-diene-3,20-dione,
6α-fluoro-9α,11β-dichloro-16α-methyl-21-(bicyclo[2.2.2]octane-1'-carbonyloxy)pregna-1,4-dien-17α-ol-3,20-dione,
6α-fluoro-9α,11β-dichloro-16α-methyl-21-(4'-methyl bicyclo[2.2.2]octane-1'-carbonyloxy)pregna-1,4-dien-17α-ol-3,20-dione,
6α,fluoro-9α,11β-dichloro-16α-methyl-21-(bicyclo[2.2.2]oct-2'-ene-1'-carbonyloxy)pregna-1,4-dien-17α-ol-3,20-dione,
6α-fluoro-9α,11β-dichloro-16α-methyl-21-(4'-methylbicyclo[2.2.2]oct-2'-ene-1'-carbonyloxy)pregna-1,4-diene-11β,17α-diol-3,20-dione,
6α-fluoro-9α,11β-dichloro-16α,17α-isopropylidenedioxy-21-(bicyclo[2.2.2]octane-1'-carbonyloxy)pregna-1,4-diene-3,20-dione,
6α-fluoro-9α,11β-dichloro-16α,17α-isopropylidenedioxy-21-(4'-methylbicyclo[2.2.2]octane-1'-carbonyloxy)pregna-1,4-diene-3,20-dione,
6α-fluoro-9α,11β-dichloro-16α,17α-isopropylidenedioxy-21-(bicyclo[2.2.2]oct-2'-ene-1'-carbonyloxy)pregna-1,4-diene-3,20-dione,
6α-fluoro-9α,11β-dichloro-16α,17α-isopropylidenedioxy-21-(4'-methylbicyclo[2.2.2]oct-2'-ene-1'-carbonyloxy)pregna-1,4-diene-3,20-dione,
16-methyl-21-(bicyclo[2.2.2]octane-1'-carbonyloxy)pregn-4-ene-11β,17α-diol-3,20-dione,
16-methyl-21-(4'-methylbicyclo[2.2.2]oct-2'-ene-1'-carbonyloxy)pregn-4-ene-11β-17α-diol-3,20-dione,
6α-fluoro-21-(bicyclo[2.2.2]octane-1'-carbonyloxy)pregn-4-ene-11β,17α-diol-3,20-dione,
6α-fluoro-21-(4'-methylbicyclo[2.2.2]oct-2'-ene-1'-carcarbonyloxy(pregn-4-ene-11β,17α-diol-3,20-dione,
6,16-dimethyl-21-(bicyclo[2.2.2]octane-1'-carbonyloxy)pregn-4-ene-11β,17α-diol-3,20-dione,
6,16-dimethyl-21-(4'-methylbicyclo[2.2.2]oct-2'-ene-1'-carbonyloxy)pregn-4-ene-11β,17α-diol-3,20-dione,
6,16-dimethyl-9α-fluoro-21-(bicyclo[2.2.2]octane-1'-carbonyloxy)pregn-4-ene-11β,17α-diol-3,20-dione,
9α-fluoro-16α,17α-isopropylidenedioxy-21-(bicyclo[2.2.2]octane-1'-carbonyloxy)pregn-4-ene-11β-ol-3,20-dione,
6-methyl-21-(4'-methylbicyclo[2.2.2]oct-2'-ene-1'-carbonyloxy)pregn-4-en-11β-ol-3,20-dione,
21-(4'-methylbicyclo[2.2.2]oct-2'-ene-1'-carbonyloxy)pregn-4-ene-11β,17α-diol-3,20-dione,
6-methyl-9α-fluoro-21-(4'-methylbicyclo[2.2.2]oct-2'-ene-1'-carbonyloxy)pregn-4-en-11β-ol-3,20-dione,
9α,11β-dichloro-16α,17α-isopropylidenedioxy-21-(bicyclo[2.2.2]octane-1'-carbonyloxy)-pregn-4-ene-3,20-dione,
9α,11β-dichloro-16α,17α-isopropylidenedioxy-21-(4'-methylbicyclo[2.2.2]oct-2'-ene-1'-carbonyloxy)pregn-4-ene-3,20-dione, including the Δ⁶, 1,2-methylene, and 6,7-halomethylene derivatives of the above compounds, such as:
6α,9α-difluoro-16α,17α-isopropylidenedioxy-21-(bicyclo[2.2.2]octane-1'-carbonyloxy)pregna-4,6-dien-11β-ol-3,20-dione, 1,2-methylene-21-(bicyclo[2.2.2]octane-1'-carbonyloxy)pregn-4-en-11β-ol-3,20-dione,
6,7-methylene-21-(bicyclo[2.2.2]octane-1'-carbonyloxy)pregn-4-en-11β-ol-3,20-dione,
6,7-difluoromethylene-21-(bicyclo[2.2.2]octane-1'-carbonyloxy)pregn-4-en-11β-ol-3,20-dione,
6,7-difluoromethylene-16α,17α-isopropylidenedioxy-21-(bicyclo[2.2.2]octane-1'-carbonyloxy)pregn-4-en-11β-ol-3,20-dione,
6,7-dichloromethylene-21-(bicyclo[2.2.2]octane-1'-carbonyloxy)pregn-4-en-11β-ol-3,20-dione,
6,7-chloromethylene-21-(bicyclo[2.2.2]octane-1'-carbonyloxy)pregn-4-en-11β-ol-3,20-dione,
6,7-fluoromethylene-21-(bicyclo[2.2.2]octane-1'-carbonyloxy)pregn-4-en-11β-ol-3,20-dione,
1,2-methylene-6,7-difluoromethylene-21-(bicyclo[2.2.2]octane-1'-carbonyloxy)pregn-4-en-11β-ol-3,20-dione, and so forth.

Upon substitution of the appropriate substituted acid chloride (as set forth in the third paragraph of Example 12, infra), in lieu of the other bicyclo carboxylic acid chloride employed herein, the corresponding C-21 monoester of the corresponding starting steroid hydroxy compounds hereof are prepared.

EXAMPLE 2

By following the procedure set forth in the first paragraph of Example 1 above, utilizing bicyclo[2.2.2] - octane-1-methylenechlorocarbonate, there is prepared 21-(bicyclo[2.2.2]octane-1' - methylenecarbonyldioxy)pregn-4-ene-11β,17α-diol-3,20-dione.

Similarly, the corresponding 21-bicyclocarbonate esters otherwise corresponding to the other steroid compounds set forth in paragraph 2 of Example 1 above are prepared.

In like manner, upon substituting the other bicyclo methylenechlorocarbonates prepared as set forth in Example 13, infra, the corresponding 21-bicyclocarbonate derivatives of the above compound and those compounds set forth in Example 1 are prepared.

EXAMPLE 3

By utilizing the procedure outlined in Example 2, using instead, tricyclo[3.3.1.1¹,⁵]decane - 1 - methylenechlorocarbonate, there is prepared 21-(tricyclo[3.3.1.1¹,⁵]-decane-1'-methylenecarbonyldioxy)pregn-4-ene - 11β,17α-diol-3,20-dione.

The corresponding 21-tricyclocarbonate esters, otherwise corresponding to the other steroid compounds set forth in the second paragraph of Example 1 above, are prepared.

EXAMPLE 4

Two milliliters of dihydropyran are added to a solution of 1 g. of pregn-4-ene-11β,17α,21-triol-3,20-dione in 150 ml. of benzene. About 1 ml. is removed by distillation to remove moisture and 0.4 g. of p-toluene-sulfonic acid is added to the cooled solution. This mixture is allowed to stand at room temperature for four hours and is then washed with an aqueous sodium carbonate solution and water, dried, and evaporated. The residue is chromatographed on neutral alumina, eluting with hexane, to yield 21-tetrahydropyran-2'-yloxypregn-4-ene-11β,17α-diol-3,20-dione which is recrystallized from pentane.

A solution of 200 mg. of 21-tetrahydropyran-2'-yloxypregn-4-ene-11β,17α-diol-3,20 - dione in 32 ml. of anhydrous isopropanol and 25 mg. of sodium borohydride is stirred at room temperature for 15 hours. One hundred milliliters of water is added and the resulting suspension is extracted several times with ether. The ether phase is dried over sodium sulfate and evaporated to dryness under reduced pressure to yield 21-tetrahydropyran-2'-yloxypregn-4-ene-3β,11β,17α-triol-20-one which may be purified by recrystallization from ether.

The thus prepared compound is thereafter treated according to the procedure set forth in the first paragraph of Example 1 above to thus yield 3β-(bicyclo[2.2.2]octane-1'-carbonyloxy)-21-tetrahydropyran - 2'-yloxypregn-4-ene-11β,17α-diol-20-one.

To a solution of 1 g. of 3β-(bicyclo[2.2.2]octane-1'-carbonyloxy) - 21 - tetrahydropyran - 2' - yloxypregn-4-ene-11β,17α-diol-20-one in 30 ml. of acetic acid is added 0.5 ml. of 2 N hydrochloric acid. The mixture is allowed to stand five hours at room temperature and then diluted with ice water and extracted with methylene chloride. The extracts are washed with water to neutrality, dried over sodium sulfate, and evaporated to dryness to yield 3β - bicyclo[2.2.2]octane - 1' - carbonyloxy)pregn-4-ene-11β,17α,21-triol-20-one which is recrystallized from acetone:hexane.

The foregoing procedures can likewise be used to prepare the corresponding 3β-mono novel esters otherwise corresponding to the compounds set forth in the second paragraph of Example 1 above.

Similarly, upon substitution of the appropriate substituted acid chloride (as set forth in the third paragraph of Example 12, infra), in lieu of the other bicyclo carboxylic acid chloride employed herein, the corresponding C–3β mono ester of the corresponding starting steroid hydroxy compounds hereof are prepared.

EXAMPLE 5

By following the procedure which are described hereinabove in Example 4 except, utilizing bicyclo[2.2.2]octane-1-methylenechlorocarbonate, there is prepared 3β-(bicyclo[2.2.2]octane - 1' - methylenecarbonyldioxy)pregn-4-ene-11β,17α,21-triol-20-one.

Similarly, the corresponding 3β-(bicyclo[2.2.2]octane-1-methylenecarbonyldioxy) esters otherwise corresponding to the other steroid compounds set forth in paragraph 2 of Example 1 above are prepared.

In like manner, upon substituting the other bicyclomethylenechlorocarbonates prepared as set forth in Example 13, infra, the corresponding 3β-mono bicyclo carbonate derivatives of the above compound and those compounds set forth in Example 1 above are prepared.

EXAMPLE 6

By utilizing the procedure outlined in Example 5 using, instead, tricyclo[3.3.1.1$^{1,5}$]decane - 1-methylenechlorocarbonate, there is prepared 3β-(tricyclo[3.3.1.1$^{1,5}$]decane-1' - methylenecarbonyldioxy)pregn - 4 - ene - 11β,17α,21-triol-20-one.

Similarly, the corresponding 3β-(tricyclo[3.3.1.1$^{1,5}$]decane-1-methylenecarbonyldioxy) esters, otherwise corresponding to the other steroid compounds set forth in the second paragraph of Example 1 above, are prepared.

EXAMPLE 7

A mixture of 2 g. of pregn-4-ene-11β,17α,21-triol-3,20-dione, 4 mg. of p-toluenesulfonic acid, and 800 ml. of benzene is refluxed for a few minutes to remove the presence of moisture. Thereafter, 1.5 ml. of bicyclo[2.2.2]-octan-1-yltrimethoxymethane are added to the mixture and refluxing is continued until the total volume is reduced to about 150 ml., after which time a few drops of pyridine are added. The solution is evaporated to dryness under vacuum and the residue recrystallized from methanol giving 17α,21 - (methoxybicyclo[2.2.2]octan - 1 - yl)methylidenedioxypregn-4-en-11β-ol-3,20-dione.

To a solution of 1 g. of 17α,21-(methoxybicyclo[2.2.2]octan - 1 - yl)methylidenedioxypregn - 4 - en-11β-ol-3,20-dione in 30 ml. of ethanol is added 0.5 ml. of 2 N hydrochloric acid. After heating the solution at 40° C. for about five minutes, the mixture is neutralized by the addition of sodium carbonate and is thereafter evaporated to dryness giving a residue which is recrystallized from ethanol giving 17α - (bicyclo[2.2.2]octane - 1'-carbonyloxy) pregn-4-ene-11β,21-diol-3,20-dione.

Upon substitution of the other bicyclo[2.2.2]octane-1-yltrialkoxymethane derivatives described in Example 15 for bicyclo[2.2.2]octan-1-yltrimethoxymethane, there are prepared the corresponding C–4 substituted and/or C–2 unsaturated bicyclo esters attached to the 17α position.

EXAMPLE 8

Upon subjection of the 21 monoesters prepared as described in Example 1 above to the reduction and esterification procedures set forth in Examples 4, 5, and 6 above, there are prepared the corresponding C–3,21 bisesters.

EXAMPLE 9

The C–17,21 bisesters are prepared upon subjecting the 17 monoesters (prepared as described in Example 7 above) to the procedure set forth in Example 1 above.

EXAMPLE 10

By treating the 17 monoesters (prepared as described in Example 7 above) to the procedures set forth in Examples 4, 5, and 6 above, the 21 etherification production step being unnecessary in those cases in which the compound does not bear a 21-hydroxyl, there are prepared the corresponding C–3,17 bisesters thereof.

EXAMPLE 11

The C–3,17,21 triesters are prepared by esterifying the 21-hydroxy-3,17 bisesters prepared as described in Example 10 above as hereinbefore set forth, such as in Example 1.

EXAMPLE 12

A mixture of 10 g. of bicyclo[2.2.2]octane-1-carboxylic acid, 20 ml. of thionyl chloride in two drops of dimethylformamide, and about 40 ml. of benzene is heated at reflux temperature for about 2.5 hours. The resultant mixture is then fractionally distilled to give bicyclo[2.2.2]octane-1-carboxylic acid chloride.

A mixture of 15 g. of 4-methylbicyclo[2.2.2]oct-2-ene-1-carboxylic acid, 25 ml. of thionyl chloride, and a drop of dimethylformamide is heated at reflux temperature for about 1.5 hours. Fractional distillation of the reaction mixture gives 4 - methylbicyclo[2.2.2]oct - 2-ene-1-carboxylic acid chloride.

Similarly, upon the substitution of other bicyclo[2.2.2]octane-1-carboxylic acids and other bicyclo[2.2.2]oct-2-ene-1-carboxylic acids in the procedures set forth in the immediately preceding two paragraphs, there is obtained the following corresponding acid chlorides:

bicyclo[2.2.2.]oct-2-ene-1-carboxylic acid chloride,
4-methylbicyclo[2.2.2.]octane-1-carboxylic acid chloride,
4-phenylbicyclo[2.2.2]oct-2-ene-1-carboxylic acid chloride,
4-phenylbicyclo[2.2.2]octane-1-carboxylic acid chloride,
4-n-propylbicyclo[2.2.2]octane-1-carboxylic acid chloride,
4-n-propylbicyclo[2.2.2]oct-2-ene-1-carboxylic acid chloride,
4-ethylbicyclo[2.2.2]octane-1-carboxylic acid chloride,
4-ethylbicyclo[2.2.2]oct-2-ene-1-carboxylic acid chloride,
4-benzylbicyclo[2.2.2]octane-1-carboxylic acid chloride,
4-chlorophenylbicyclo[2.2.2]octane-1-carboxylic acid chloride,
4-chlorobicyclo[2.2.2]octane-1-carboxylic acid chloride,
4-chlorobicyclo[2.2.2]oct-2-ene-1-carboxylic acid chloride,
4-fluorobicyclo[2.2.2]octane-1-carboxylic acid chloride,
4-fluorobicyclo[2.2.2]oct-2-ene-1-carboxylic acid chloride,
4-trifluoromethylbicyclo[2.2.2]octane-1-carboxylic acid chloride,
4-trifluoromethylbicyclo[2.2.2]oct-2-ene-1-carboxylic acid chloride,
4-cyanobicyclo[2.2.2]octane-1-carboxylic acid chloride,
4-cyanobicyclo[2.2.2]oct-2-ene-1-carboxylic acid chloride, 4-acetoxybicyclo[2.2.2]octane-1-carboxylic acid chloride,
4-acetoxybicyclo[2.2.2]oct-2-ene-1-carboxylic acid chloride,
4-methoxybicyclo[2.2.2]octane-1-carboxylic acid chloride,
4-methoxybicyclo[2.2.2]oct-2-ene-1-carboxylic acid chloride,
4-methoxymethylbicyclo[2.2.2]octane-1-carboxylic acid chloride,
4-methoxymethylbicyclo[2.2.2]oct-2-ene-1-carboxylic acid chloride,
4-acetoxymethylbicyclo[2.2.2]octane-1-carboxylic acid chloride, and
4-acetoxymethylbicyclo[2.2.2]oct-2-ene-1-carboxylic acid chloride.

EXAMPLE 13

A solution of 1 g. of sodium borohydride in 3 ml. of water is added to an ice cooled solution of 1 g. of bicyclo[2.2.2]octane-1-carboxylic acid in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield bicyclo[2.2.2]octane-1-methylol which may be further purified by recrystallization from acetone:hexane.

Bicyclo[2.2.2]octane-1-methylol (15.5 g.) is slowly added with stirring to 15 g. of liquid carbonyl chloride (phosgene) contained in a reaction vessel immersed in a Dry Ice-trichloroethylene bath. During the addition, the temperature of the carbonyl chloride solution is kept at or below 0° C. After the addition is complete, the temperature of the solution is allowed to slowly rise to room temperature. The mixture is maintained at room temperature with stirring for from 10 to 15 hours, steps being taken to remove expelled carbonyl chloride. Thereafter, the reaction mixture is distilled under reduced pressure to give bicyclo[2.2.2]octane-1-methylenechlorocarbonate.

Similarly, the above procedures can be used to prepare the other C-2 unsaturated and/or C-4 substituted analogs thereof otherwise corresponding to the derivatives set forth in the third paragraph of Example 12 above, with the exception of the 4-cyano, 4-acyloxy, and 4-acyloxymethyl derivatives.

EXAMPLE 14

The procedure set forth in Example 13 is repeated substituting tricyclo[3,3.1.1$^{1,5}$]decane-1-carboxylic acid (adamantane-1-carboxylic acid) for bicyclo[2.2.2]octane-1-carboxylic acid thus giving tricyclo[3.3.1.1$^{1,5}$]decane-1-methylol initially and tricyclo[3.3.1.1$^{1,5}$]decane-1-methylenechlorocarbonate as a final product.

EXAMPLE 15

To a solution maintained at 0° C. and containing 5 g. of bicyclo[2.2.2]octane-1-carboxylic acid chloride in 100 ml. of benzene is saturated with ammonia. The mixture is allowed to stand for one hour at which time it is washed with several portions of water, dried over sodium sulfate, and evaporated to dryness under reduced pressure to yield bicyclo[2.2.2]octan-1-amide.

An intimate mixture of equal molar quantities of the thus prepared amide and phosphorous pentoxide is heated at from 100° C. to 220° C. Distillation under reduced pressure of the product as it is formed gives bicyclo[2.2.2]octane-1-cyanide.

Into a solution of 5.0 g. of the cyanide compound thus obtained in 25 ml. of methanol is passed hydrogen chloride at room temperature until one chemical equivalent has been absorbed. The mixture is stirred for 24 hours after which time it is diluted with ether and filtered to give a solid.

The solid thus obtained is dissolved in 25 ml. of methanol and is stirred for about three days at room temperature after which time the solvent is removed by evaporation giving bicyclo[2.2.2]octan - 1 - yltrimethoxymethane.

Similarly, upon substituting the other bicyclooctane-1-carboxylic acid chlorides (as prepared in Example 12 above) in the above procedure, the corresponding C-2 unsaturated and/or C-4 substituted bicyclo[2.2.2]octan-1-yltrimethoxymethanes are prepared.

EXAMPLE 16

To a mixture of 10 g. of bicyclo[2.2.2]octane-1-carboxylic acid in a solution consisting of 25 ml. of ether and 10 ml. of pyridine is added a cold ether solution containing the chemical equivalent of acetyl chloride. The reaction mixture is allowed to stand at 0° C. for four hours and the resultant precipitate removed by filtration. The solution is washed with 25 ml. of concentrated hydrochloric acid, ice water, a 7% sodium hydroxide solution and again ice water, the washed solution is dried at 0° C. over sodium sulfate, filtered, the ether evaporated to give bicyclo[2.2.2]octane-1-carboxylic acetyl anhydride which can be recrystallized from methanol.

Similarly, the other corresponding mixed anhydride starting compounds are analagously prepared.

These derivatives can be substituted for the corresponding acid chlorides employed in the foregoing examples with similar results.

EXAMPLE 17

A mixture of 0.5 g. of pregn-4-en-11$\beta$-ol-3,20-dione, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield pregna-1,4-dien-11$\beta$-ol-3,20-dione which is further purified by recrystallization from acetone:hexane.

A mixture of 1 g. of pregn-4-en-11$\beta$-ol-3,20-dione, 2 g. of chloranil, 15 ml. of ethyl acetate, and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina there is obtained pregna-4,6-dien-11$\beta$-ol-3,20-dione which may be further purified by recrystallization from acetone:hexane.

A mixture of 1 g. of pregna-4,6-dien-11$\beta$-ol-3,20-dione, 2 g. of chloranil, and 10 ml. of n-amyl alcohol are refluxed under nitrogen for 24 hours. The mixture is then cooled, washed with a cold aqueous solution of 10% sodium hydroxide until the washings are colorless, dried over sodium sulfate, and evaporated. Chromatography of the residue on neutral alumina yields pregna-1,4,6-trien-11$\beta$-ol-3,20-dione which may be further purified through recrystallization from acetone:hexane.

The conventional etherification and esterification procedures are accomplished by the following representative procedures.

EXAMPLE 18

To 120 ml. of acetone containing 1 g. of pregn-4-ene-11$\beta$,16$\alpha$,17$\alpha$-triol-3,20-dione are added thirty drops of 70% perchloric acid. The mixture is allowed to stand one hour at room temperature, thirty drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate, and evaporated to dryness. The residue upon trituration with methanol yields 16$\alpha$,17$\alpha$-isopropylidenedioxypregn-4-en-11$\beta$-ol-3,20-dione which is recrystallized from methanol.

A mixture of 1 g. of pregn-4-ene-11$\beta$,17$\alpha$,21-triol-3,20- dione, 4 ml. of pyridine, and 2 ml. of acetic anhydride is allowed to stand at room temperature for fifteen hours. The mixture is then poured into ice water and the solid which forms is collected by filtration, washed with water, and dried to yield 21-acetoxypregn-4-ene-11β,17α-diol-3,20-dione which may be further purified through recrystallization from acetone:exane.

In like manner, upon substitution of an alternate anhydride in lieu of acetic anhydride, the corresponding secondary ester is prepared.

A mixture of 1 g. of pregn-4-ene-11β,17α-diol,3,20-dione, 1 g. of p-toluenesulfonic acid monohydrate, 50 ml. of acetic acid, and 25 ml. of acetic anhydride is allowed to stand at room temperature for twenty-four hours, and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride and the methylene chloride extract is washed with water to neutrality, dried, and evaporated to yield 17α - acetoxypren-4-en-11β-ol-3,20-dione which is recrystallized from acetone:ether.

In like manner, upon substitution of an alternate anhydride of the above procedures, the corresponding tertiary ester is prepared.

C–6 substituents are introduced as follows.

EXAMPLE 19

To a suspension of 1 g. of pregn-4-en-11β-ol-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for fifteen minutes and allowed to stand at room temperature for thirty minutes. There is then added 0.8 ml. of pyridine, followed by water until solidification occurs. This solid is collected by filtration, washed with water, and air dried to yield 3-ethoxypregna-3,5(10)-dien-11β-ol-20-one which is recrystallized from acetone:hexane.

A mixture of 5 g. of 3-ethoxypregna-3,5(10)-dien-11β-ol-20-one, 2 g. of anhydrous sodium acetate, and 100 ml. of acetone is treated with 32 ml. of water. The solution is cooled to 5° C. and 1.1 molar equivalents of N-chlorosuccinimide and 2 ml. of glacial acetic acid are added. The mixture is stirred for thirty minutes at the same temperature and then diluted with water. After being allowed to stand at 0° C. for fifteen hours, the solid is collected by filtration, washed with water, and dried under vacuum to yield 6β-chloropregn-4-en-11β-ol-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water, and dried to yield 6α-chloropregn-4-en-11β-ol-3,20-dione which is recrystallized from acetone:hexane.

A stream of perchloryl fluoride is passed through a solution of 1 g. of 3-ethoxypregna-3,5(10)-dien-11β-ol-20-one in 25 ml. of dimethylformamide, cooled to 0° C. for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate, and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of twenty-four hours and at a temperature of 15° C. The mixture is poured into cold water and the solid which forms is collected by filtration, washed with water, and dried to yield 6α-fluoropregn-4-en-11β-ol-3,20-dione which is recrystallized from acetone:hexane.

The C–9 and C–11 substituents are introduced as follows.

EXAMPLE 20

One gram of pregn-4-en-11β-ol-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water, and extracted with ethyl acetate. The extracts are washed with water, dried over sodium sulfate, and evaporated to yield pregna-4,9(11)-diene-3,20-dione which may be further purified through recrystallization from acetone:hexane.

To a solution of 1.6 g. of pregna-4,9(11)-diene-3,20-dione in 4 ml. of chloroform is added over a five minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality. dried over sodium sulfate, and evaporated to dryess to yield 9α,11β-dichloropregn-4-ene-3,20-dione which may be recrystallized from acetone:hexane.

Twenty-eight grams of N-bromoacetamide are added over a one hour period with stirring, in the dark and at room temperature, to a mixture of 50 g. of pregna-4, 9(11)-diene-3,20-dione, 500 ml. of pure dioxane, and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for ten hours, cooled and almost all of the acetone is removed by distillation. Iced water is then added and the solid which forms collected by filtration, washed with water, and dried to yield 9β,11β-oxidopregn-4-ene-3,20-dione which may be further purified through recrystallization from methylene chloride:benzene.

To a stirred solution of 4 g. of 9β,11β-oxidopregn-4-ene-3,20-dione in 40 ml. of anhydrous chloroform, are added over a period of 35 minutes and at 0° C., 30 ml. of a 0.45 N chloroform solution of dry hydrogen chloride. The mixture is stirred for one hour at 0° C. and then diluted with water. The organic layer is separated, washed with aqueous sodium bicarbonate solution and with water, dried over sodium sulfate, and evaporated under reduced pressure to yield 9α-chloropregn-4-en-11β-ol-3,20-dione which is recrystallized from acetone:hexane.

To a stirred solution of 1.8 g. of 9β,11β-oxidopregn-4-ene-3,20-dione in 30 ml. of methylene chloride, cooled to 0° C. is added a cooled solution of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate, and concentrated until solid forms. The cooled mixture is then filtered and the solid dissolved in hot ethyl acetate. This solution is filtered hot and then cooled and the solid which forms collected by filtration to yield 9α-fluoropregn-4-en-11β-ol-3,20-dione.

EXAMPLE 21

To a solution of 5 g. of pregna-4,6-diene-11β,17α,21-triol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 17α,20; 20,21-bismethylenedioxypregna-4,6-dien-11β-ol-3-one which is recrystallized from methanol:ether.

To a gently refluxing and stirred solution of 1 g. of 17α,20; 20,21-bismethylenedioxypregna-4,6-diene-11β-ol-3-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried, and chromatographed on alumina, eluting with methylene chloride to yield 6α,7α-difluoromethylene-17α,20; 20,21-bismethylenedioxy-pregn-4-en-11β-ol-3-one.

A suspension of 1 g. of 6,7-difluoromethylene-17α,20; 20,21-bismethylenedioxypregn-4-en-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evapoarted to dryness under reduced pressure and chromatographed on silica gel with 2:1 hexane:ethyl acetate to yield 6α,7α-difluoromethylenepregn-4-ene-11β,17α,21-triol-3,20-dione and the 6β,7β isomer which are further purified through recrystallization from isopropanol.

By utilizing the other Δ$^{4,6}$ compounds hereof, the 6,7-difluoromethylene derivatives corresponding thereto are prepared.

Upon substituting the sodium trichloroacetate for sodium chlorodifluoroacetate in the above procedure, the corresponding 6,7-dichloromethylene derivatives are prepared. Similarly, upon substitution of sodium dichlorofluoroacetate, sodium dichloroacetate, and sodium chlorofluoroacetate in the above procedure, there are respectively obtained the corresponding 6,7-chlorofluoromethylene, 6,7-chloromethylene, and 6,7-fluoromethylene derivatives.

EXAMPLE 22

A solution of 0.5 g. of 17α,20; 20,21-bismethylenedioxypregna-1,4-dien-11β-ol-3-one in 5 ml. of dimethylsulfoxide is added to a solution in dimethylsulfoxide, prepared ylsulfoxonium methylide in dimethylsulfoxide, prepared in the manner of Corey et al., J. Am. Chem. Soc., 87, 1353 (1965). The mixture is stirred under nitrogen and at room temperature for 20 hours and then at 50° C. for seven hours. Fifty milliliters of water are then added and the resulting mixture extracted four times with 50 ml. of ethyl acetate. The combined extracts are washed with water and saturated aqueous sodium chloride solution, dried over sodium sulfate, and evaporated to dryness. This residue is then chromatographed on silica, eluting with ether:methylene chloride to yield 1α,2α-methylene-17α,20; 20,21-bismethylenedioxypregn-4-en-11β-ol-3-one and its corresponding 1β,2β-methylene isomer.

Cleavage of the bismethylenedioxy group as described above, thereafter yields 1,2-methylenepregn-4-en-11β,17α,21-triol-3,20-dione.

Upon introduction of the Δ$^{4,6}$ system into the so produced methylene compounds and treating them according to the procedure set forth in Example 21 above, the corresponding 1,2-methylene-6,7-difluoromethylene compounds are prepared.

Similarly, the 6,7-methylene derivatives of the Δ$^{4,6}$ corresponding starting compounds hereof are prepared.

EXAMPLE 23

To a solution of 1 g. of 17α-(bicyclo[2.2.2]octane-1'-carbonyloxy)pregn-4-en-3β-ol-20-one in 20 ml. of benzene, 20 ml. of dihydrofuran is added. Five milliliters is distilled off to remove moisture and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield 3β-tetrahydrofuran-2'-yloxy-17α - (bicyclo[2.2.2]octane - 1'-carbonyloxy)pregn-4-en-20-one.

Two milliliters of dihydropyran are added to a solution of 1 g. of 17α-(bicyclo[2.2.2]octane-1'-carbonyloxy)-pregn-4-en-3β-ol-20-one in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqueous sodium carbonate solution and water, dried, and evaporated. The residue is chromatographed on neutral alumina, eluting with hexane, to yield 3β-tetrahydropyran-2'-yloxy - 17α-(bicyclo[2.2.2]octane-1'-carbonyloxy)pregn-4-en-20-one which is recrystallized from pentane.

A solution of one chemical equivalent of 17α-(bicyclo [2.2.2]octane-1'-carbonyloxy)pregn - 4-en-3β-ol-20-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period 20 minutes. The mixture is allowed to reflux for 20 hours after which time the precipitate of sodium bromide is removed by filtration and the organic phase dried and evaporated to yield 3β-cyclopentyloxy-17α(bicyclo[2.2.2] octane-1'-carbonyloxy)pregn-4-en-3β-ol-20-one which is further purified upon recrystallization from pentane.

In like manner, the foregoing etherification procedure can be practiced on the other 3β-hydroxy derivatives already bearing the 17α novel mono ester.

What is claimed is:
1. Compounds of the formula:

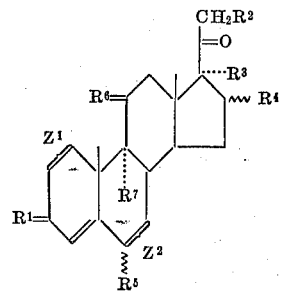

wherein
R¹ is an oxygen atom or the group

in which R⁸ is hydroxy, and the conventional hydrolyzable esters thereof, tetrahydropyran-2-yloxy, tetrahydrofuran-2-yloxy, cyclopentyloxy, or a polycyclic group represented by one of the formulas:

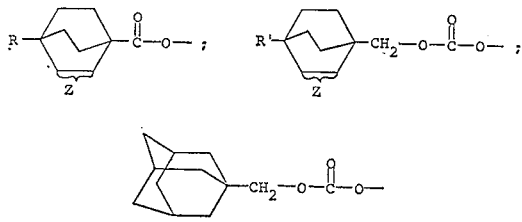

in which R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R exclusive of cyano, acyloxy, and acyloxymethyl, and Z is a carbon-carbon single bond or a carbon-carbon double bond;
R² is hydroxy and the conventional hydrolyzable esters thereof, or a polycyclic group represented by one of the formulas:

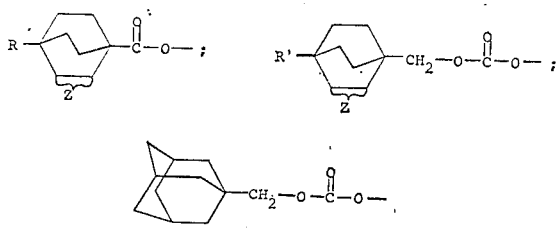

in which each of R, R' and Z is as already defined;
R³ is hydrogen, hydroxy and the conventional hydrolyzable esters thereof, or a polycyclic group represented by the formula:

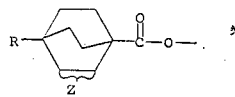

in which each of R and Z is as already defined;
R⁴ is hydrogen, hydroxy, methyl, or taken together with R³, alkylidenedioxy;
R⁵ is hydrogen, chloro, fluoro, or methyl;
R⁶ is an oxygen atom or the group

in which R⁹ is hydroxy or chloro;
R⁷ is hydrogen, chloro, fluoro, or when taken together with R⁶, β-oxido, R⁷ and R⁹ being the same when R⁹ is chloro;
each of Z¹ and Z² is a carbon-carbon single bond, a carbon-carbon double bond or a methylene group of the formula:

in which each of X and Y is hydrogen, chloro or fluoro, Z¹ being a carbon-carbon single bond when R¹ is other than an oxygen atom;
one of R², R³, and R⁸ being said polycyclic group.

2. Compounds according to claim 1 wherein R³ is said polycyclic group.

3. Compounds according to claim 1 wherein R¹ is the group

in which R⁸ is a polycyclic group represented by one of the formulas:

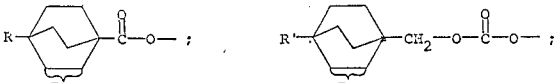

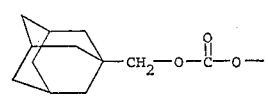

in which R is hydrogen or methyl; R' is hydrogen or methyl; and Z is as therein defined.

4. Compounds according to claim 3 wherein R² is hydroxy; R³ is hydrogen or hydroxy; R⁴ is an α-methyl or, when taken together with R³, isopropylidenedioxy; R⁵ is a α-fluoro; R⁶ is the group

in which R⁹ is hydroxy or chloro; R⁷ is hydrogen, chloro or fluoro, R⁷ and R⁹ being the same when R⁹ is chloro; and each of Z¹ and Z² is a carbon-carbon single bond.

5. Compounds according to claim 1 wherein R² is a polycyclic group represented by one of the formulas:

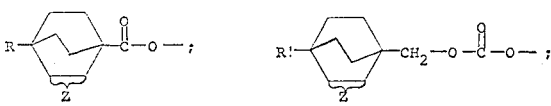

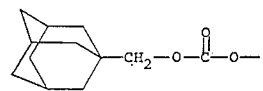

in which R is hydrogen or methyl; R' is hydrogen or methyl; and Z is as therein defined; and R¹ is an oxygen atom; R³ is hydrogen or hydroxy; R⁴ is α-methyl or, when taken together with R³, isopropylidenedioxy; R⁵ is α-fluoro; R⁶ is the group

in which R⁹ is hydroxy or chloro; R⁷ is hydrogen, chloro, or fluoro, R⁷ and R⁹ being the same when R⁹ is chloro; Z¹ is a carbon-carbon double bond; and Z² is a carbon-carbon single bond.

6. Compounds according to claim 5 wherein R² is the group

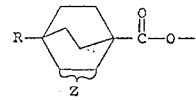

and R³ is hydrogen; R⁴ is α-methyl; R⁹ is hydroxy; R⁷ is hydrogen; and each of R, Z, R¹, R⁵, Z¹, and Z² is as therein defined.

7. Compounds according to claim 5 wherein R² is the group

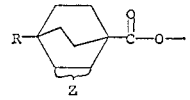

and R³ is hydroxy; R⁴ is α-methyl; R⁹ is hydroxy; R⁷ is hydrogen; and each of R, Z, R¹, R⁵, Z¹, and Z² is as therein defined.

8. Compounds according to claim 5 wherein R² is the group

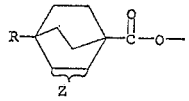

and $R^3$ and $R^4$ taken together is isopropylidenedioxy; $R^9$ is hydroxy; $R^7$ is hydrogen; and each of R, Z, $R^1$, $R^5$, $Z^1$, and $Z^2$ is as therein defined.

9. Compounds according to claim 5 wherein $R^2$ is the group

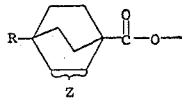

and $R^3$ is hydrogen; $R^4$ is α-methyl; $R^9$ is chloro; $R^7$ is chloro; and each of R, Z, $R^1$, $R^5$, $Z^1$, and $Z^2$ is as therein defined.

10. Compounds according to claim 5 wherein $R^2$ is the group

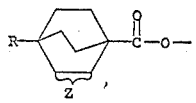

and $R^3$ is hydroxy; $R^4$ is α-methyl; $R^9$ is chloro; $R^7$ is chloro; and each of R, Z, $R^1$, $R^5$, $Z^1$, and $Z^2$ is as therein defined.

11. Compounds according to claim 5 wherein $R^2$ is the group

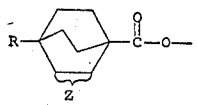

and $R^3$ and $R^4$ taken together is isopropylidenedioxy; $R^9$ is chloro; $R^7$ is chloro; and each of R, Z, $R^1$, $R^5$, $Z^1$, and $Z^2$ is as therein defined.

12. Compounds according to claim 5 wherein $R^2$ is the group

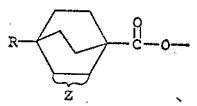

and $R^3$ is hydrogen; $R^4$ is α-methyl; $R^9$ is hydroxy; $R^7$ is fluoro; and each of R, Z, $R^1$, $R^5$, $Z^1$, and $Z^2$ is as therein defined.

13. Compounds according to claim 5 wherein $R^2$ is the group

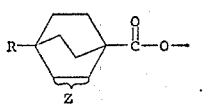

and $R^3$ is hydroxy; $R^4$ is α-methyl; $R^9$ is hydroxy; $R^7$ is fluoro; and each of R, Z, $R^1$, $R^5$, $Z^1$, and $Z^2$ is as therein defined.

14. Compounds according to claim 5 wherein $R^2$ is the group

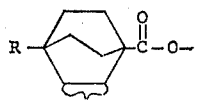

and $R^3$ and $R^4$ taken together is isopropylidenedioxy; $R^9$ is hydroxy; $R^7$ is fluoro; and each of R, Z, $R^1$, $R^5$, $Z^1$ and $Z^2$ is as therein defined.

15. Compounds according to claim 5 wherein $R^2$ is the group

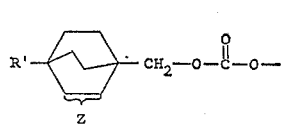

and $R^3$ is hydrogen; $R^4$ is α-methyl; $R^9$ is hydorxy; $R^7$ is hydrogen; and each of R', Z, $R^1$, $R^5$, $Z^1$ and $Z^2$ is as therein defined.

16. Compounds according to claim 5 wherein $R^2$ is the group

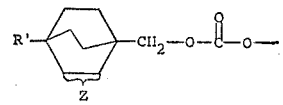

and $R^3$ is hydroxy; $R^4$ is α-methyl; $R^9$ is hydroxy; $R^7$ is hydrogen; and each of R' Z, $R^1$, $R^5$, $Z^1$ and $Z^2$ is as therein defined.

17. Compounds according to claim 5 wherein $R^2$ is the group

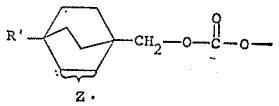

and $R^3$ and $R^4$ taken together is isopropylidenedioxy; $R^9$ is hydroxy; $R^7$ is hydrogen; and each of R', Z, $R^1$, $R^5$, $Z^1$, and $Z^2$ is as therein defined.

18. Compounds according to claim 5 wherein $R^2$ is the group

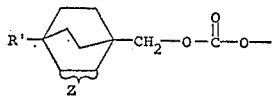

and $R^3$ is hydrogen; $R^4$ is α-methyl; $R^9$ is chloro; $R^7$ is chloro; and each of R', Z' $R^1$, $R^5$, $Z^1$, and $Z^2$ is as therein defined.

19. Compounds according to claim 5 wherein $R^2$ is the group

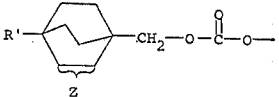

and $R^3$ is hydroxy; $R^4$ is α-methyl; $R^9$ is chloro; $R^7$ is chloro; and each of R', Z, $R^1$, $R^5$, $Z^1$, and $Z^2$ is as therein defined.

20. Compounds according to claim 5 wherein $R^2$ is the group

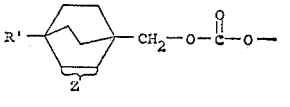

and $R^3$ and $R^4$ taken together is isopropylidenedioxy; $R^9$ is chloro; $R^7$ is chloro; and each of R', Z, $R^1$, $R^5$, $Z^1$, and $Z^2$ is as therein defined.

21. Compounds according to claim 5 wherein $R^2$ is the group

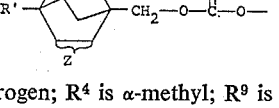

and $R^3$ is hydrogen; $R^4$ is α-methyl; $R^9$ is hydroxy; $R^7$ is fluoro; and each of R', Z, $R^1$, $R^5$, $Z^1$, and $Z^2$ is as therein defined.

22. Compounds according to claim 5 wherein $R^2$ is the group

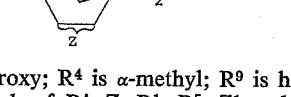

and $R^3$ is hydroxy; $R^4$ is α-methyl; $R^9$ is hydroxy; $R^7$ is fluoro; and each of R', Z, $R^1$, $R^5$, $Z^1$ and $Z^2$ is therein defined.

23. Compounds according to claim 5 wherein $R^2$ is the group

and $R^3$ and $R^4$ taken together is isopropylidenedioxy; $R^9$ is hydroxy; $R^7$ is fluoro; and each of $R'$, $Z$, $R^1$, $R^5$, $Z^1$, and $Z^2$ is as therein defined.

24. Compounds according to claim 5 wherein $R^2$ is the group

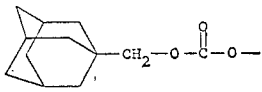

and $R^3$ is hydrogen; $R^4$ is α-methyl; $R^9$ is hydroxy; $R^7$ is hydrogen; and each of $R^1$, $R^5$, $Z^1$, and $Z^2$ is as therein defined.

25. Compounds according to claim 5 wherein $R^2$ is the group

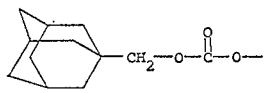

and $R^3$ is hydroxy; $R^4$ is α-methyl; $R^9$ is hydroxy; $R^7$ is hydrogen; an deach of $R^1$, $R^5$, $Z^1$, and $Z^2$ is as therein defined.

26. Compounds according to claim 5 wherein $R^2$ is the group

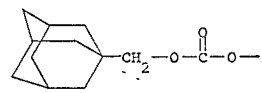

and $R^3$ and $R^4$ taken together is isopropylidenedioxy; $R^9$ is hydroxy; $R^7$ is hydrogen; and each of $R^1$, $R^5$, $Z^1$, and $Z^2$ is as therein defined.

27. Compounds according to claim 5 wherein $R^2$ is the group

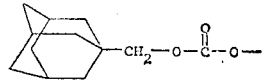

and $R^3$ is hydrogen; $R^4$ is α-methyl; $R^9$ is chloro; $R^7$ is chloro; and each of $R^1$, $R^5$, $Z^1$, and $Z^2$ is as therein defined.

28. Compounds according to claim 5 wherein $R^2$ is the group

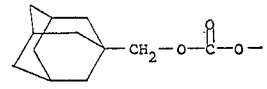

and $R^3$ is hydroxy; $R^4$ is α-methyl; $R^9$ is chloro; $R^7$ is chloro; and each of $R^1$, $R^5$, $Z^1$, and $Z^2$ is as therein defined.

29. Compounds according to claim 5 wherein $R^2$ is the group

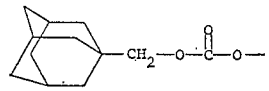

and $R^3$ andl $R^4$ taken together is isopropylidenedioxy; $R^9$ is chloro; $R^7$ is chloro; and each of $R^1$, $R^5$, $Z^1$, and $Z^2$ is as therein defined.

30. Compounds according to claim 5 wherein $R^2$ is the group

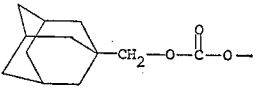

and $R^3$ is hydrogen; $R^4$ is α-methyl; $R^9$ is hydroxy; $R^7$ is fluoro; and each of $R^1$, $R^5$, $Z^1$, and $Z^2$ is as therein defined.

31. Compounds according to claim 5 wherein $R^2$ is the group

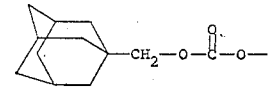

and $R^3$ is hydroxy; $R^4$ is α-methyl; $R^9$ is hydroxy; $R^7$ is fluoro; and each of $R^1$, $R^5$, $Z^1$, and $Z^2$ is as therein defined.

32. Compounds according to claim 5 wherein $R^2$ is the group

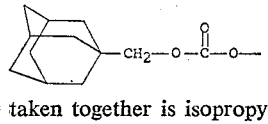

and $R^3$ and $R^4$ taken together is isopropylidenedioxy; $R^9$ is hydroxy; $R^7$ is fluoro; and each of $R^1$, $R^5$, $Z^1$, and $Z^2$ is as therein defined.

No references cited.

ELBERT L. ROBERTS, Primary Examiner

U.S. Cl. X.R.

260—397.45, 999

UNITED STATES PATENT OFFICE
CERTIFICATE OF CORRECTION

Patent No. 3,484,436    Dated December 16, 1969

Inventor(s) Alexander D. Cross and John H. Fried

It is certified that error appears in the above-identified patent and that said Letters Patent are hereby corrected as shown below:

Column 1, lines 55 to 65, the formula should appear as follows:

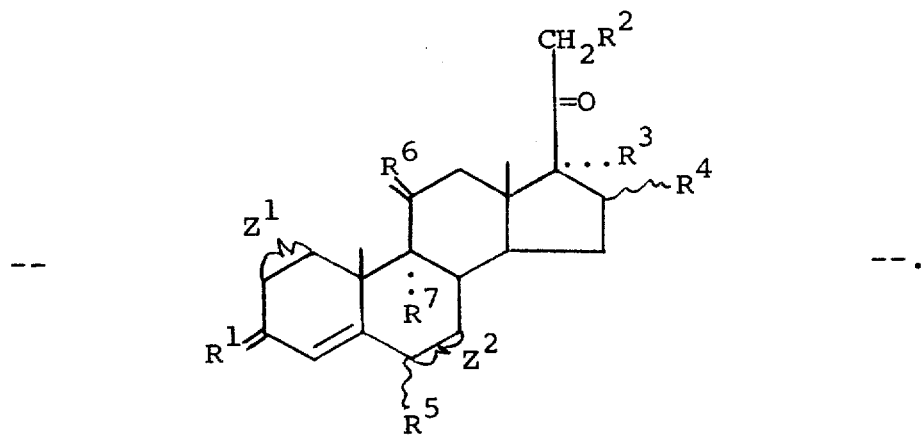

(I)

Column 22, line 29, "Z'" should read --Z--.

Column 23, line 21, "an deach" should read --and each--.

SIGNED AND SEALED
JUN 23 1970

(SEAL)
Attest:

Edward M. Fletcher, Jr.
Attesting Officer

WILLIAM E. SCHUYLER, JR.
Commissioner of Patents